(12) United States Patent
Schwartz et al.

(10) Patent No.: US 7,226,494 B1
(45) Date of Patent: Jun. 5, 2007

(54) SECURE POSTAGE PAYMENT SYSTEM AND METHOD

(75) Inventors: Robert G. Schwartz, Branford, CT (US); George M. Brookner, Norwalk, CT (US); Fetneh Eskandari, Middletown, CT (US); Michael A. Brown, Norwalk, CT (US); David H. Mechler, Woodbury, CT (US); Gary A. Gardner, deceased, late of Palm Desert, CA (US); by Gaye D. Gardner, legal representative, Palm Desert, CA (US); Douglas T. Heroy, Meriden, NH (US)

(73) Assignee: Neopost Technologies (FR)

( * ) Notice: Subject to any disclaimer, the term of this patent is extended or adjusted under 35 U.S.C. 154(b) by 0 days.

(21) Appl. No.: 08/973,293

(22) PCT Filed: Apr. 23, 1997

(86) PCT No.: PCT/US97/06831

§ 371 (c)(1),
(2), (4) Date: Dec. 1, 1997

(87) PCT Pub. No.: WO97/40472

PCT Pub. Date: Oct. 30, 1997

(51) Int. Cl.
*G06F 17/00* (2006.01)
(52) U.S. Cl. .......................... 75/401; 705/401
(58) Field of Classification Search ............. 705/60, 705/61, 62, 66, 401, 402, 408, 410, 1
See application file for complete search history.

(56) References Cited

U.S. PATENT DOCUMENTS

| | | | |
|---|---|---|---|
| 4,015,523 A | 4/1977 | Evans et al. | 101/233 |
| 4,097,923 A | 6/1978 | Eckert, Jr. et al. | 705/408 |
| 4,405,829 A | 9/1983 | Rivest et al. | 380/30 |

(Continued)

FOREIGN PATENT DOCUMENTS

EP 0286768 * 10/1988

(Continued)

OTHER PUBLICATIONS

Bielski: "Billpay, revisited. (Trieense Software's PaySense )(Breif Article)"; ABA Banking Journal, Mar. 1999, vol. 91, No. 3, p. 56.*

(Continued)

*Primary Examiner*—Thomas A. Dixon
(74) *Attorney, Agent, or Firm*—Kenyon & Kenyon LLP

(57) ABSTRACT

In a postage payment system, a secure integrated circuit (IC) card is used to manage postage funds, and create encrypted postage indicia. Among other things, the system is capable of performing charge-back accounting of postage expenses and generating mail contents. In accordance with an aspect of the invention, the postage indicia are applied onto selected locations of the mail contents while they are being generated. In the preferred embodiment, each mail content is placed in a window envelope such that the postage indicium on the mail content exposes through a window of the envelope to facilitate inspection of the indicium. In accordance with another aspect of the invention, by including transactional data in addition to the traditional postal data in a postage indicium, the indicium can be used to pay bills, purchase products and services, including any courier service different than the postal service.

46 Claims, 6 Drawing Sheets

U.S. PATENT DOCUMENTS

| | | | |
|---|---|---|---|
| 4,725,718 A * | 2/1988 | Sansone et al. ............... 235/495 |
| 4,743,747 A * | 5/1988 | Fougere et al. ............... 235/494 |
| 4,802,218 A * | 1/1989 | Wright et al. .................. 705/60 |
| 4,809,185 A * | 2/1989 | Talmadge ..................... 705/403 |
| 4,812,994 A * | 3/1989 | Taylor et al. ................. 705/410 |
| 4,831,555 A * | 5/1989 | Sansone et al. .............. 358/1.14 |
| 4,837,701 A * | 6/1989 | Sansone et al. ............... 705/404 |
| 4,853,864 A * | 8/1989 | Hart et al. .................... 705/403 |
| 4,853,961 A * | 8/1989 | Pastor .......................... 713/176 |
| 4,855,920 A | 8/1989 | Sansone et al. ......... 364/464.02 |
| 4,858,138 A * | 8/1989 | Talmadge ..................... 705/408 |
| 4,873,645 A | 10/1989 | Hunter et al. ................ 364/479 |
| 4,893,338 A * | 1/1990 | Pastor ........................... 705/60 |
| 4,900,903 A * | 2/1990 | Wright et al. ................ 235/380 |
| 4,900,904 A * | 2/1990 | Wright et al. ................ 235/381 |
| 4,933,849 A * | 6/1990 | Connell et al. ................ 700/90 |
| 4,934,846 A * | 6/1990 | Gilham ......................... 400/104 |
| 4,947,333 A * | 8/1990 | Sansone et al. ............... 705/403 |
| 4,959,795 A * | 9/1990 | Christensen et al. ......... 705/407 |
| 4,980,542 A * | 12/1990 | Jackson et al. .............. 235/375 |
| 4,998,204 A * | 3/1991 | Sansone et al. ............... 705/404 |
| 4,999,481 A * | 3/1991 | Baer et al. ................... 235/375 |
| 5,085,470 A * | 2/1992 | Peach et al. ................... 283/58 |
| 5,237,506 A | 8/1993 | Harbal et al. ................. 705/403 |
| 5,276,884 A * | 1/1994 | Mohan et al. ................ 711/163 |
| 5,283,744 A * | 2/1994 | Abumehdi et al. .......... 705/410 |
| 5,319,562 A * | 6/1994 | Whitehouse ................. 705/403 |
| 5,326,181 A * | 7/1994 | Eisner et al. ................ 400/104 |
| 5,326,959 A * | 7/1994 | Perazza ....................... 235/379 |
| 5,490,077 A * | 2/1996 | Freytag ....................... 705/405 |
| 5,508,933 A * | 4/1996 | Abumehdi ................... 705/408 |
| 5,510,992 A * | 4/1996 | Kara ............................ 705/408 |
| 5,535,279 A * | 7/1996 | Seestrom ....................... 380/55 |
| 5,602,743 A * | 2/1997 | Freytag ....................... 705/408 |
| 5,602,921 A * | 2/1997 | Ramadei ....................... 380/51 |
| 5,606,507 A * | 2/1997 | Kara ............................ 705/408 |
| 5,608,636 A * | 3/1997 | Guenther ..................... 705/408 |
| 5,615,120 A * | 3/1997 | Schwartz et al. ............ 705/407 |
| 5,625,694 A * | 4/1997 | Lee et al. ....................... 705/60 |
| 5,650,934 A * | 7/1997 | Manduley .................... 700/215 |
| 5,651,103 A * | 7/1997 | Arsenault et al. ........... 358/1.18 |
| 5,801,944 A * | 9/1998 | Kara ............................ 705/401 |
| 5,812,991 A * | 9/1998 | Kara ............................ 705/410 |
| 6,157,919 A | 12/2000 | Cordery et al. ................ 705/60 |
| 6,260,029 B1 * | 7/2001 | Critelli ........................ 705/408 |
| 6,327,578 B1 * | 12/2001 | Linchcan ...................... 705/65 |
| 2002/0023055 A1 * | 2/2002 | Antognini et al. ............. 705/40 |

FOREIGN PATENT DOCUMENTS

| | | | |
|---|---|---|---|
| EP | 0717376 | | 6/1996 |
| GB | 2319217 | * | 5/1998 |
| JP | 62-194594 | | 8/1987 |
| JP | 63015387 | | 1/1989 |
| JP | 1309195 | | 8/1989 |
| JP | 62060084 | | 9/1990 |
| JP | 4016394 | | 1/1992 |
| JP | 6191120 | | 7/1994 |
| JP | 63015386 | | 12/1994 |
| WO | WO 88/01818 | | 3/1988 |
| WO | WO 99/66456 | * | 12/1999 |

OTHER PUBLICATIONS

"New postal imprinting to affect Soho"; Managing Office Technology, Jun. 1997, vol. 42, No. 6, p. 13.*

* cited by examiner

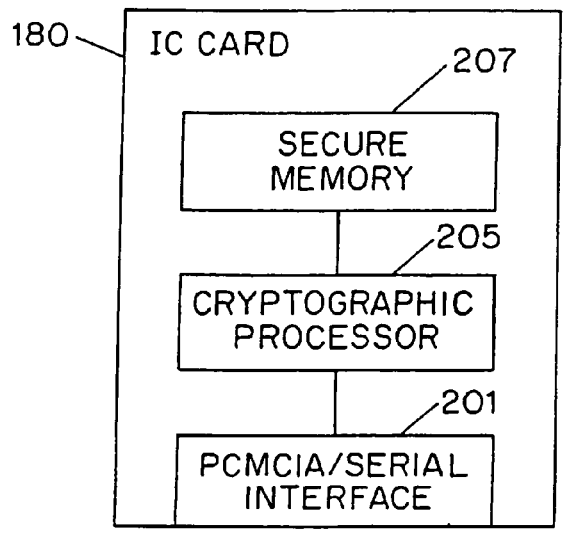
FIG. 2
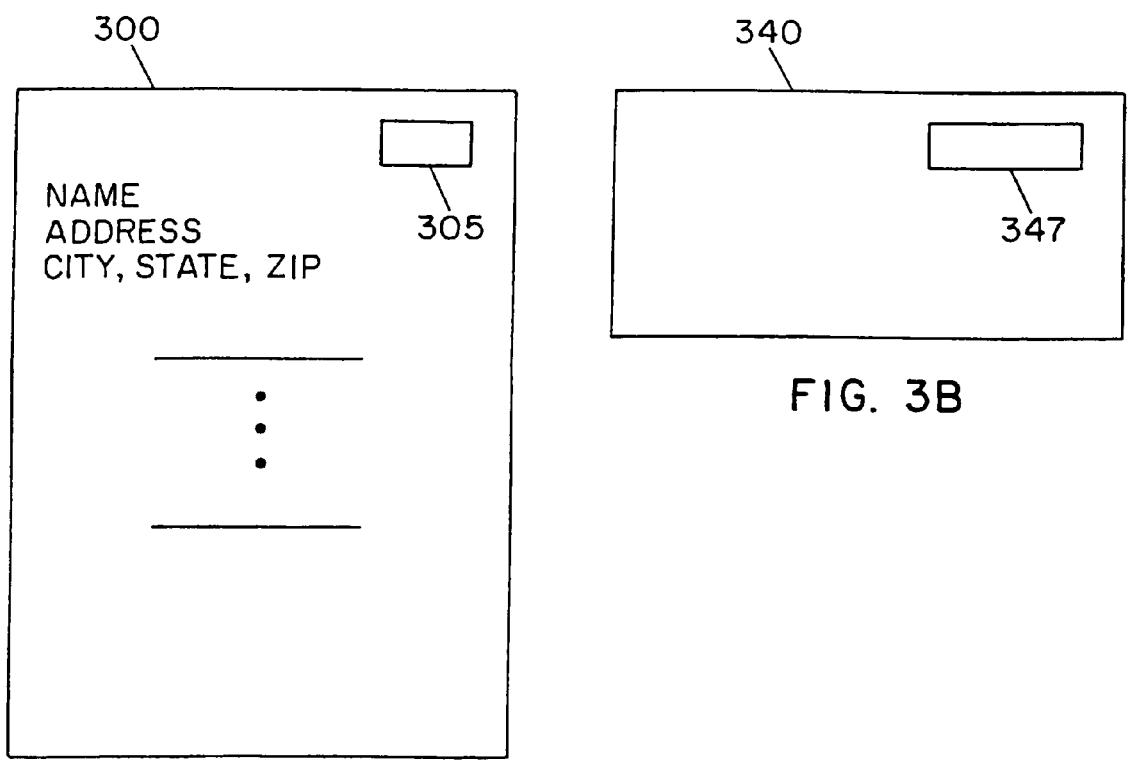
FIG. 3A
FIG. 3B

SECURE POSTAGE PAYMENT SYSTEM AND METHOD

TECHNICAL FIELD

The invention relates to postage payment systems and methods, and particularly to systems and methods for managing and securely dispensing postage payments.

BACKGROUND OF THE INVENTION

In this information age, use of computers to process, transfer, and store data is ubiquitous. To prevent tampering or unauthorized use of the data which contains vital information, cryptographic technology has been developed.

Well-known cryptographic methods for maintaining secrecy of data communications include a data encryption standard (DES) method. For details on the DES method, one may refer to: M. Smid et al., "The Data Encryption Standard: Past and Future," *Proceedings of the IEEE*, Vol. 76, No. 5, May 1988. This method requires a DES algorithm, and a secret key known only to the sender and recipient of the data. The DES algorithm involves a number of iterations of a simple transformation of the data using the key. In each transformation, transposition and substitution techniques are alternately applied to the data.

Also well-known is the RSA cryptographic method, named after its developers, Rivest, Shamir and Adleman. For details on the RSA method, one may refer to: R. Rivest et al., "A Method for Obtaining Digital Signatures and Public Key Cryptosystems," *Communications of the ACM*, Vol. 21, No. 2, February 1978. The RSA method involves a public key algorithm which uses a private key and a public key for data encryption. Unlike a private key, a public key can be published and made known to the public. The keys for the RSA algorithm are generated mathematically, and are computational inverses to each other. The success of the RSA method depends on the use of very large numbers for the keys.

In addition to providing encryption of a data message, some cryptographic methods can also be used to authenticate the message. For example, public key encryption algorithms such as the aforementioned RSA algorithm can be used to produce a "digital signature" for verifying the origin of the message and the identity of the sender. Another algorithm known as the "Digital Signature Algorithm (DSA)" can be used for that purpose as well. A digital signature is distinct for each data transaction. When a message is encrypted at the sender's end, the sender uses his/her private key to digitally sign the message. When the message is decrypted at the recipient's end, the recipient uses the sender's public key to verify the digital signature. If any alteration in either signature or message occurs, the signature does not verify.

Another well-known method for verifying the authenticity of a data message is based on the idea of arbitrated authentication. In accordance with this method, a third-party certification authority (sometimes called a "digital notary") certifies an individual's or entity's public key so that the authority authenticating the digital signature is assured that the public key used to verify the message contents is truly associated with the sender.

Because of the ubiquitous presence of computers (in particular, personal computers (PCs)), prior art has suggested use of a general purpose computer, in lieu of a specialized postage meter, to print postage indicia serving as a proof of postage on mail pieces. To deter printing of unauthorized postage, the postage indicium applied on a mail piece includes postal data which is digitally signed, and thereby can be authenticated by a postal authority when the mail piece is processed. To facilitate the mail processing, the indicium is generated in the form of a bar-code readable by a scanner.

SUMMARY OF THE INVENTION

In accordance with the invention, a postage payment system incorporating a general purpose computer is capable of securely dispensing postage, and efficiently generating mail pieces. In particular, with the inventive postage payment system, postage indicia are advantageously generated at the same time as mail contents such as letters, invoices, and statements. In accordance with an aspect of the invention, a postage indicium is applied onto a selected location of the mail content. In the preferred embodiment, the mail content is placed into a window envelope such that the postage indicium on the mail content exposes through a window of the envelope to facilitate inspection of the indicium.

In addition, the inventive system is capable of conducting encrypted communications, and loading and dispensing of postage funds stored in a secure integrated circuit (IC) card. Moreover, the inventive system provides charge-back accounting capabilities to account for postage expenses by individuals or departments. Further, the inventive system is capable of extracting from the mail contents certain postal data such as zip code data for inclusion in a postage indicium.

Still further, we have revolutionized the concept of a postage indicium which is traditionally used as a proof of postage for mailing services rendered by a postal authority, such as the United States Postal Service (USPS). We have recognized that a postage indicium is documentation of a transaction by the originator of the indicium. Thus, in accordance with another aspect of the invention, by incorporating, in addition to the traditional postal data, transactional data including a transaction amount and payment instructions in a postage indicium, the indicium becomes a money order payable to a specified payee. In that instance, when the postal authority inspects the indicium, recognizing that at least part of the indicium represents a money order, the postal authority acts as a payer bank and pays the transaction amount to the specified payee according to the payment instructions. As such, the postage indicium can be used not only as a proof of postage for the mail piece being delivered by the postal authority, but also as a money order to pay bills or repay debts to any party which may or may not be the recipient of the mail piece.

In particular, by specifying the payee of the money order represented by the indicium to be a courier (e.g., FedEx) different from the postal authority, and the transaction amount to be the cost of the courier service, we have invented a universal postage indicium for paying any courier service.

BRIEF DESCRIPTION OF THE DRAWING

Further objects, features and advantages of the invention will become apparent from the following detailed description taken in conjunction with the accompanying figures showing a preferred embodiment of the invention, in which:

FIG. 2 is a block diagram of an integrated circuit (IC) card used in the system of FIG. 1 to dispense postage;

FIG. 3A illustrates a document generated by the system of FIG. 1 in accordance with the invention;

FIG. 3B illustrates a window envelope in accordance with the invention for enclosing the document of FIG. 3A;

Throughout the figures of the drawing, the same reference numerals and characters are used to denote like features, elements, components or portions of the illustrated system.

DETAILED DESCRIPTION

Figure 1:
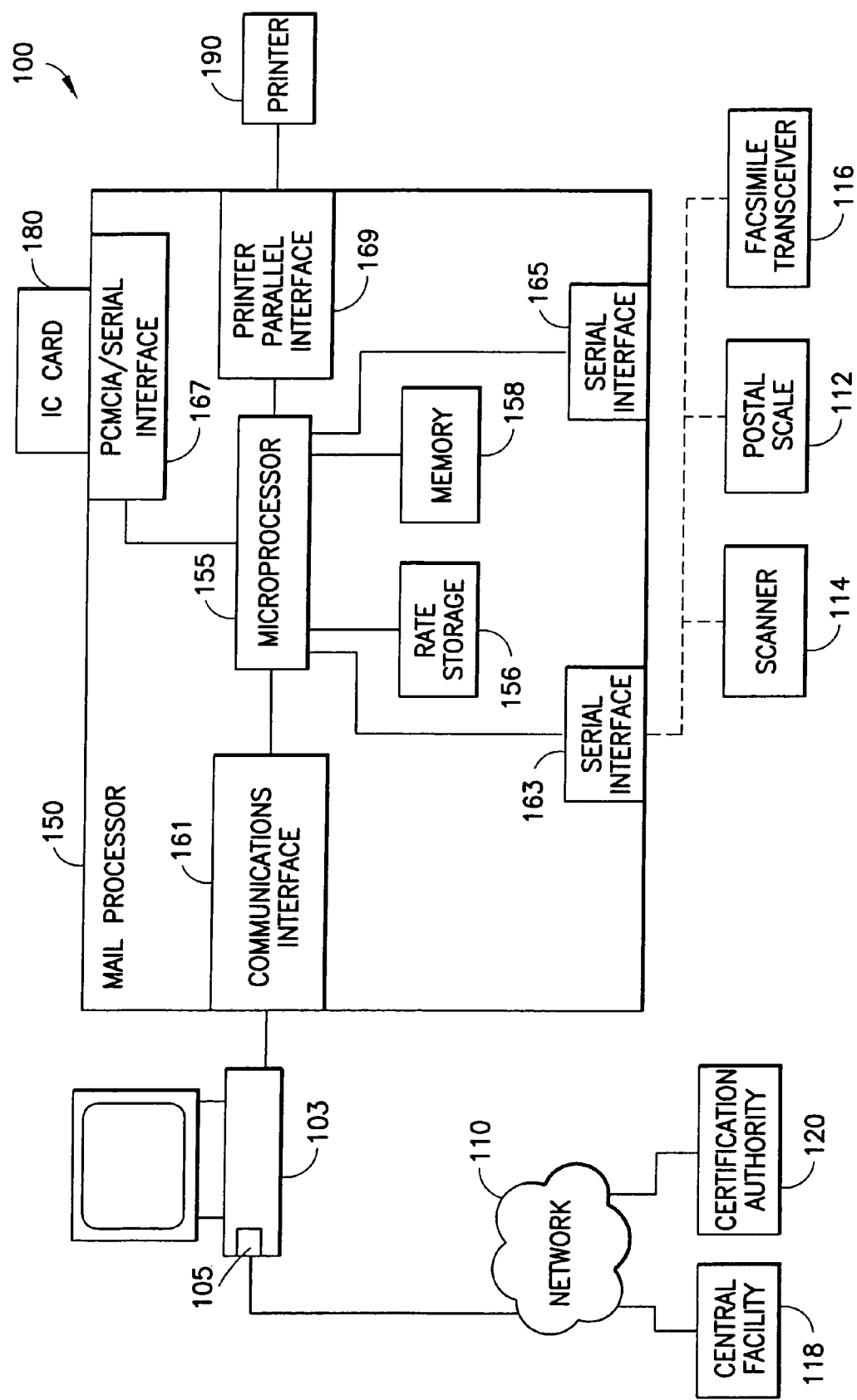
FIG. 1 illustrates a postage payment system in accordance with the invention.

FIG. 1 illustrates postage payment system 100 embodying the principles of the invention. As shown in FIG. 1, system 100 comprises computer 103 (e.g., a standard PC or workstation), mail processor 150, integrated circuit (IC) card 180, and printer 190 (e.g., a standard inkjet or laser printer). In particular, installed on computer 103 is a mailing application program in accordance with the invention. Also installed on the computer is conventional word processor, billing, accounting and/or other software which, among other things, enables a user to generate mail contents in text and graphics. Computer 103 is connected to mail processor 150.

Central to mail processor 150 is microprocessor 155 which, among other things, communicates and processes data to and from various interfaces. These interfaces include communications interface 161 for connection with computer 103 as mentioned before, serial interfaces 163 and 165 for connection with devices such as a conventional optical scanner 114 (e.g., a bar-code scanner) and a facsimile device 116 for transmission and receiving materials, and postage scale 112, PCMCIA or serial (PCMCIA/serial) interface 167 for interfacing with IC card 180, and printer parallel interface 169 for connection with printer 190.

Processor 150 includes rate storage 156 for storing rate schedule data relating to different courier services. Because of the volume of the data involved, storage 156 in this instance is dedicated, and a non-volatile memory which may be an electrically erasable programmable read-only memory (EEPROM), a flash EEPROM, or a battery-backed random-access memory (RAM). The rate schedule data may be stored in a manner typified by tables or other formats to facilitate the search by microprocessor 155 for correct postage rates for the mail piece being processed. Other related information for use in optimum methods to obtain postage may also be stored in storage 156. As is well known, the cost of delivery of a mail piece to a destination depends upon not only the weight of the mail piece, but also the particular courier service used, the destination zone, the class of shipment, and the selected service options. For example, in the United States, courier services such as USPS, United Parcel Service (UPS) and FedEx each have independent, different postage rates, and charges for different service options. For instance, USPS has various rates for first, second and third mailing classes, standard (A) classes, express mail service, priority mail service, parcel post service, book rate service, etc. UPS levies extra charges for service options such as the collect on delivery (COD), delivery confirmation response (DCR) and declared value (DV) options.

Mail processor 150 also includes memory 158 for storing a control program, which contains various routines for microprocessor 155 to perform in carrying out different functions to be described.

Referring to FIG. 2, IC card 180 has PCMCIA/serial interface 201 for interfacing with and insertion into mail processor 150, and includes cryptographic processor 205, and secure memory 207. The components in IC card 180 may be realized using a chip set of the type of the NETARMOR VMS310 chip set manufactured by VLSI Technology, Inc, or alternatively the chip set typified by smart card technology.

Secure memory 207 which is a nonvolatile memory comprises a descending register and an ascending register. In a conventional manner, the descending register is used to keep track of an amount of postage available for dispensation. On the other hand, the ascending register is used to keep track of an amount of postage dispensed. It may be desirable to store the accounting data in the registers redundantly, as set forth in PCT Pub. No. WO 89-11134. In addition, it is extremely desirable to protect the memory from harm due to processor malfunction, as set forth in U.S. Pat. No. 5,276,884, in EP Pub. No. 527010, or in EP Pub. No. 737944.

When the value of the descending register decreases over time below a predetermined limit, system 100 can no longer dispense postage until the descending register is reset. Such a reset can be accomplished using well-known telemeter setting (TMS) techniques. For example, some of these techniques are disclosed in EPO Pub. No. EP 442671, PCT Pub. No. WO 86-05611, U.S. Pat. No. 5,237,506, and U.S. Pat. No. 4,097,923.

Using a TMS technique in this instance, the user need not carry card 180 to a postal authority for authorized resetting of the register. To initiate a TMS process in system 100, the user is required to enter a key or password on mail processor 150 using its keypad (not shown). Verification of the password entry ensures that the user is authorized to conduct such a process. After the password entry is verified, processor 150 initiates a call through a modem 105 incorporated in computer 103 to a computerized central facility 118, requesting additional available postage. Upon receipt of the call, the central facility 118 rifles specified encrypted data stored in secure memory 207 of card 180, and ascertains the availability of funds in the user's prefunded escrow account. After the encrypted data is validated and the funds are found to be sufficient, the central facility 118 debits the user's account and remotely resets the descending register in card 180 accordingly. A message is then communicated to mail processor 150, confirming the funds transfer.

It will be appreciated that the postage funds on card 180 may also be recharged at an automatic teller machine (ATM) or a similar machine using an ATM card, a credit card, debit card, charge card, telephone calling card, telephone prepaid card or prepaid transit fare card, or at a vending machine using cash; or recharged using other funds transfer techniques including electronic funds transfer (EFT) through network 110, such as, a private network, the ATM network, the EFT network, the Internet, etc.

Secure memory 207 also includes an encryption algorithm, e.g., an RSA algorithm, a digital signature algorithm (DSA) or similar algorithm, and the public and private keys associated therewith. For instance, using the DSA, cryptographic processor 205 may encrypt specified postal data with the public key, together with any transactional data in accordance with the invention (described below), and/or sign the data with the private key to produce a digital signature to be included in a postage indicium for its authentication. In addition, the stored public key may be provided in the indicium for the postal authority 120 to verify the digital signature.

It will be appreciated that in secure memory 207, which may be multiple discrete memory devices, critical information may be stored in a redundant and historical manner for the purpose of analysis leading to reconstruction of events regarding funds administration.

As mentioned before, the user may utilize the word processor, billing and/or accounting software on computer 103 to generate mail contents such as letters, invoices and statements. Traditionally, the mail content after it is generated is placed into an envelope, and a proof of postage is then applied onto the envelope. The resulting mail piece is ready to be sent. We have recognized that such a practice is inefficient in that the generation and application of the proof of the postage is a separate step from the generation of the mail content. In accordance with the invention, with the aforementioned mailing application program, the step of generation and application of a postage indicium is made part of the mail content generation step. Specifically, the mail content is printed at the same time as the postage indicium. In the preferred embodiment, the indicium is printed at a selected location of the mail content such that after it is placed in a window envelope, the indicium is exposed through a window of the envelope for inspection.

FIG. 3A illustrates mail content 300 generated by system 100 in accordance with the invention. As shown in FIG. 3A, postage indicium 305 is printed in the upper right corner of the mail content. FIG. 3B illustrates corresponding window envelope 340 for enclosing mail content 300. As shown in FIG. 3B, envelope 340 includes window 347 in its upper right corner where a proof of postage is traditionally placed. Window 347 may be uncovered, or covered by glassine or similar transparent or translucent material. In accordance with the invention, window 347 coincides with postage indicium 305 when mail content 300 is folded and placed into envelope 340.

It will be appreciated that where it is allowed, postage indicium 305 will be printed close to or become part of an address block so that a traditional window envelope can be used, whose window coincides with the address block. In addition, non-window envelopes can also be used in the event that the postage indicium can be scanned through the envelopes using an infrared, a magnetic, or similar scanner.

Figure 4:
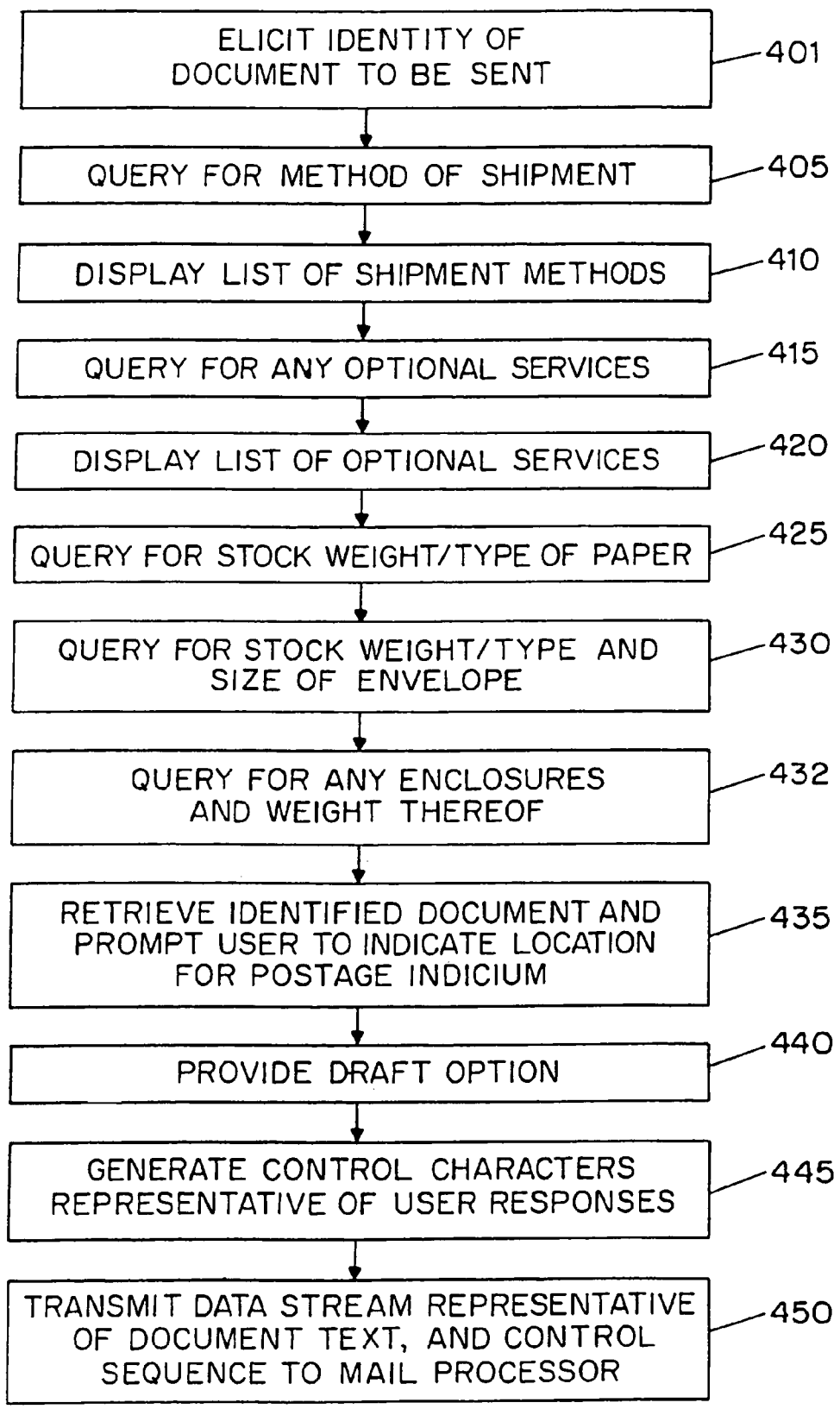
FIG. 4 is a flow chart depicting the steps of a mailing application program used in the system of FIG. 1.

The aforementioned mailing application program installed on computer 103 will now be described. By way of example, the program in question is invoked by the user after the text of a document has been entered using the word processor capability on computer 103 and the user has decided to send the document. FIG. 4 is a flow chart depicting the steps of the mailing application program. Instructed by such a program, computer 103 elicits from the user the identity of the document to be sent, as indicated at step 401. After the user identifies the document by its name and path on computer 103, the latter at step 405 queries the user for the method of shipment. Accordingly, computer 103 at step 410 displays a list of shipment methods for the user to select. The selection may be accomplished by pointing and clicking at the desired method using an indicator device such as a mouse (not shown) connected to computer 103.

As soon as the user selects one of the shipment methods, say, USPS first class mail, computer 103 at step 415 queries the user for any optional services to be used for the shipment. Accordingly, computer 103 at step 420 displays a list of optional services applicable to the selected shipment method. After the user selects one of the optional services, say, certified mail, computer 103 queries the user for the stock weight or type of the paper to be used for printing the document, as indicated at step 425. Upon receiving the stock weight or type entry, say, 24 lbs. (or bond "x"), computer 103 at step 430 queries the user for the stock weight or type and size of the envelope to be used. In this instance, the user indicates that a 24 lb. (or tyvek "x") #10 envelope is to be used. Computer 103 then queries at step 432 whether there are any enclosures and the weight thereof. In this instance, the user indicates that there is no enclosure.

Utilizing, in part, the word processor capability, computer 103 at step 435 retrieves the identified document on the screen, and prompts the user to indicate the desired location on the document where the postage indicium is to be printed. Alternatively, predefined setups for different formats may be utilized. In this instance, the user indicates the location being the upper right corner of page 1 of the document. Computer 103 thereafter provides at step 440 a draft option which enables the user to preview the document including a specimen indicium appearing at the user defined location before the document is printed. Thus, this option allows the user to check the format of the document and the relative placement of the address block, postage indicium and such on the document before the user is committed thereto.

After the user decides to proceed with the printing of the document, computer 103 at step 445 generates an ensemble of control characters representative of the above user responses. At step 450, computer 103 transmits the data stream representative of the text of the document to mail processor 155, along with a control sequence comprising the ensemble of control characters preceded by a header. This header comprises a special character pattern and contains information on the length of the ensemble.

The data stream is formatted pursuant to the protocol required by printer 190. For example, if printer 190 is a printer manufactured by Hewlett-Packard Co., the data stream would be in accordance with the Hewlett-Packard printer control language (HP-PCL).

After the data stream and the control sequence are received by mail processor 150, the latter searches the input for the aforementioned special character pattern in the header. In an absence of such a pattern, processor 150 determines that the input consists of only plain print data (i.e., plain text). If that is the case, the input would be passed onto printer 190 through interface 169 without modification. However, in this instance, the special character pattern has been detected by mail processor 150. Such a detection invokes a postage payment routine stored in memory 158.

Figure 5:
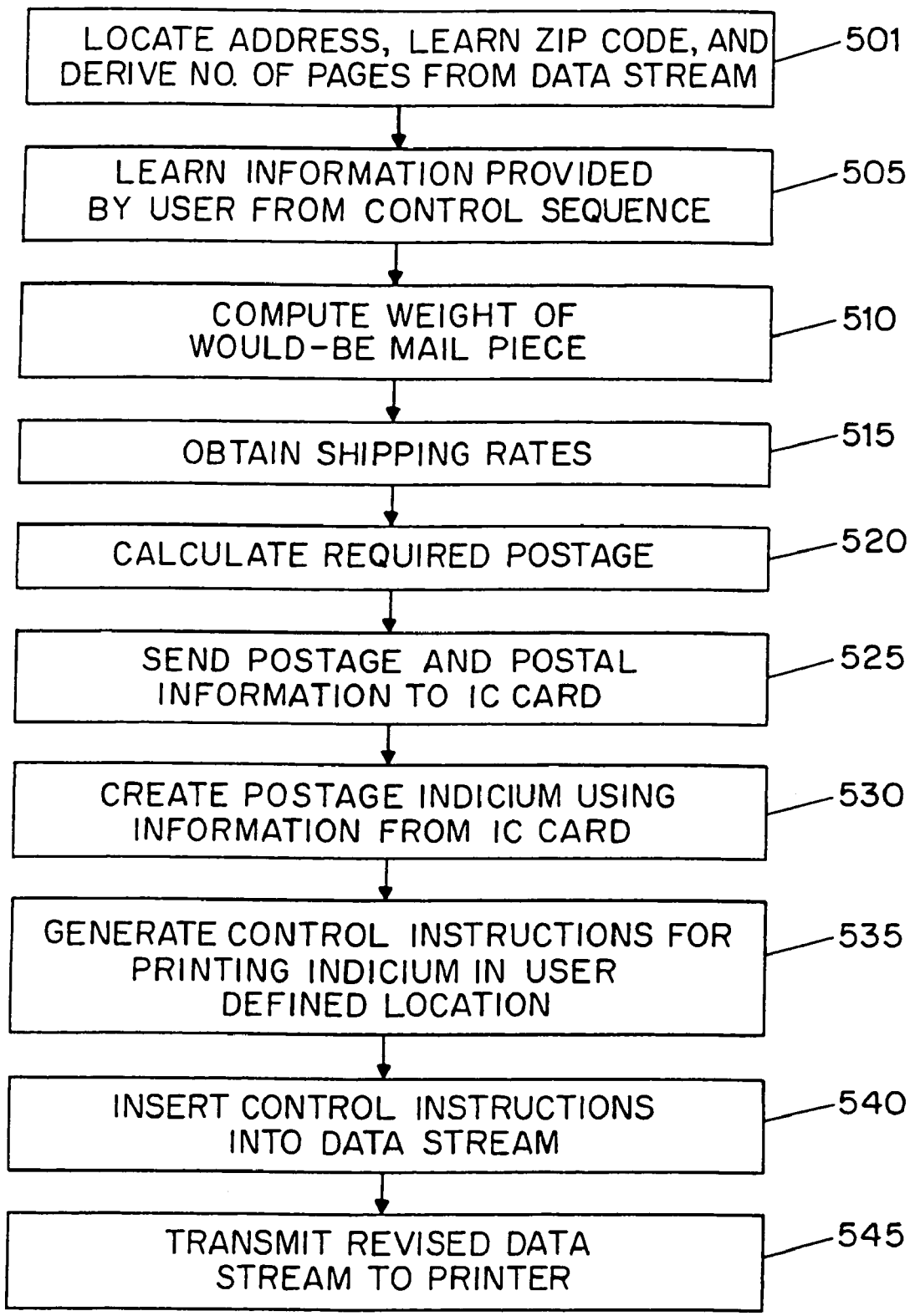
FIG. 5 is a flow chart depicting the steps of a routine run by a mail processor in the system of FIG. 1.

FIG. 5 illustrates a flow chart depicting the steps of the postage payment routine. Instructed by this routine, microprocessor 155 searches the data stream and control sequence to obtain pertinent information to compute the required postage and to place the postage indicium at the user defined location. From the data stream, microprocessor 155 locates the destination address and learns its zip code, and derives the number of pages in the document, as indicated at step 501. From the control sequence, microprocessor 155 learns the above information provided by the user including the method of shipment, selected optional services, stock weight/type of the paper, stock weight/type and size of the envelope, the location of the postage indicium, etc., as indicated at step 505. Microprocessor 155 then computes at step 510 the weight of the would-be mail piece using the knowledge of the number of pages of the document, stock weight of the paper, and stock weight and size of the envelope. Based on the computed weight, and the knowledge of the destination zip code, method of shipment and selected optional services, microprocessor 155 at step 515 obtains from the rate schedule in storage 156 the relevant shipping rates. Microprocessor 155 then calculates at step 520 the required postage. At step 525, microprocessor 155 sends the required postage and postal information including the zip code information to IC card 180 through PCMCIA/ serial interface 167. Alternatively, the user may manually enter the weight and rates.

Upon receiving such information, processor 205 in card 180 deducts the required postage value from the available postage funds in the aforementioned descending register, and accordingly adds same to the dispensed funds in the ascending register to account for the transaction. Processor 205 then provides to mail processor 150, a digital signature and other necessary information such as the ascending and descending register values, for creating a postage indicium in processor 150. Alternatively, processor 205 itself may create the postage indicium and pass it onto mail processor 150. In any event, in this instance the postage indicium includes human readable information and a 2-dimensional bar-code pursuant to, say, the well-known Uniform Symbology Specification PDF 417. It should be noted that a one-dimensional bar-code may be used in lieu of a 2-dimensional bar-code if the former should have sufficient data capacity.

Figure 6:
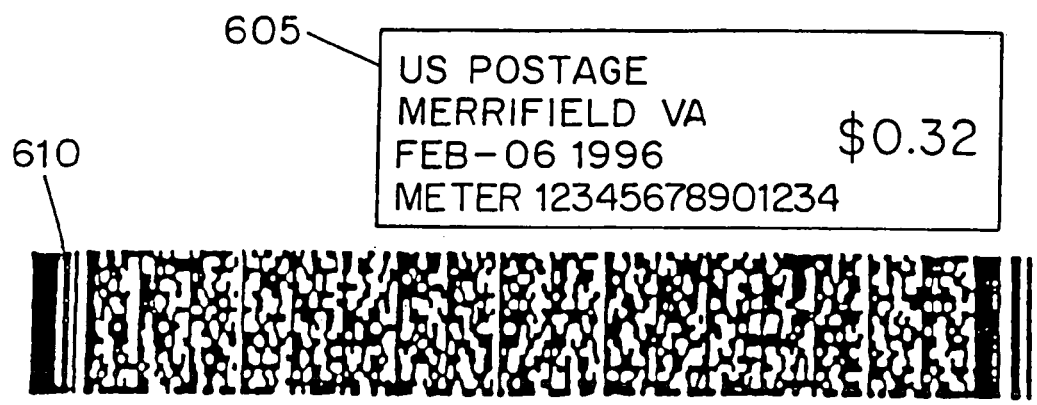
FIG. 6 illustrates a postage indicium generated by the system of FIG. 1.

FIG. 6 illustrates one such postage indicium created in mail processor 150, where human readable portion 605 in this instance includes information concerning the postage, mailing date, etc., and bar-code portion 610 is representative of the postal data required by the postal authority, and the digital signature for authenticating the indicium as mentioned before.

However, it should be pointed out at this juncture that by further including transactional data in human readable portion 605 and bar-code portion 610 in accordance with the invention, the indicium of FIG. 6 may also be used as a secure money order payable to a specified payee. In particular, as described hereinbelow, if the payee is specified to be a courier service such as the FedEx service, the postage indicium would represent a service payment to the courier service. As such, the present postage payment routine and the above-described mailing application program are applicable not only to the postal service but other courier services.

Referring back to FIG. 5, after microprocessor 155 receives from card 180 the aforementioned information, it creates the postage indicium of FIG. 6 using the received information, as indicated at step 530. microprocessor 155 at step 535 generates control instructions compatible with the language of printer 190 for printing the indicium in the user defined position (in this instance, the upper right corner of page 1 of the document). At step 540, microprocessor 155 inserts the control instructions into the data stream representative of the text of the document. The revised data stream is then transmitted to printer 190 through interface 169, as indicated at step 545. Accordingly, printer 190 generates the document including the proper postage indicium in the upper right corner of page 1 thereof. As a result, when the document is folded and inserted in a window envelope such as envelope 340 in FIG. 3B, the indicium is exposed and can readily be inspected.

It should be noted at this point that it is advantageous to have the postage indicium printed on the mail content particularly when automated inserting equipment is used to enclose inserts with the mail content. As the automated inserting equipment processes encoded data on the mail content indicative of certain inserts (e.g., a pamphlet) to be added to the mail piece, by correlating the postage amount in the indicium with the weight of the inserts, the equipment ensures that the correct inserts are added.

In a company environment, mail processor 150 is most likely connected to a number of computers similar to computer 103 in a network arrangement to generate mail contents. In addition, in such an environment, an accounting of the postage expenses may be necessary to charge back individuals or departments responsible therefor. To that end, the postage payment routine of FIG. 5 performed in mail processor 150 can readily be modified. Specifically, at step 501, microprocessor 155 can also search the data stream representing the text of the document for the author's identity and/or authorization, which may be his/her name in the signature block, telephone number, preselected password and/or code appearing in the text. With the identity and/or authorization information, microprocessor 155 can attribute the corresponding postage expense to the author himself/ herself or to his/her department while the mail content is being generated. This is advantageous because otherwise, if the charge-back accounting is performed after the preparation of the mail content, for instance, when the postage indicium is applied on an envelope, special equipment such as a scanner for scanning the indicium may be required for that purpose.

In addition, by using the above charge-back accounting technique, microprocessor 155 can also attribute the postage expense to a user/department before the postage indicium is applied. This is advantageous in that if the user/department is identified to be unauthorized to expend postage funds in system 100, e.g., not on an authorized list kept in processor 150, the generation of the mail content, together with the postage indicium, would be suspended to prevent fraudulent or unauthorized use. An unauthorized use may stem from a depletion of postage funds previously allocated to the user/ department account.

In any event, an exception report identifying the unauthorized user/department may be generated by processor 150 through printer 190. If after an investigation, the individual/ department is determined to be allowed to expend postage funds in system 100, the suspended job may be reactivated and the individual/department as identified by processor 150 is then added to the authorized list.

Processor 150 can also maintain a database to automatically collect information about mail contents processed thereby including the corresponding postage information. Such a database is useful in many ways. For example, it can be used to furnish secure audit trails for a long-term security check against fraudulent attempts to compromise the integrity of the postage dispensing function of system 100. In particular, the secure audit trails provide a parametric feedback of multiple users/accounts commingled and used randomly in real time.

In addition, with the above database, various statistical analyses can be performed, and statistics such as the median postage expense per mail piece, the most popular shipment method used, etc. can be generated. Based on such statistics, a company can cut costs, for example, by encouraging the employees to use a less expensive, albeit less popular, courier service whenever it is possible.

The above database can also be used for tracking the mail pieces generated by system 100, each of which may be uniquely identified by, for example, its source, destination, time of generation, etc.

The above charge-back accounting and database are realized based on the mail pieces generated within system 100. For mail pieces generated outside system 100, the accounting and database in question can be similarly realized by using a conventional scanner connected to mail processor 150. In particular, if the user's name, account number, destination zip code, special routing data, etc. are encoded in a bar-code on the face of the mail pieces, a bar-code scanner can be used to extract the information therefrom. Otherwise, an optical character recognition (OCR) scanner or a similar device is used to scan the text appearing on the envelopes, postcards, etc. With the extracted information, accounts for charge-backs may be automatically created, updated and maintained.

The required postage for the above mail pieces processed by processor 150 may be determined by a conventional electronic postage scale connected to processor 150. Again, before processor 150 generates a postage indicium on a label to be applied onto a mail piece, the validity of the user account can be checked to prevent fraudulent or unauthorized use. Of course, if such illegitimate use is not anticipated, the scanning of the mail pieces may be performed after the generation of the postage indicium or confirmation of the postage dispensation.

In addition to using a postage indicium as a proof of postage, using the indicium to pay bills, repay debts, and purchase products and services in accordance with the invention will now be described. Each household each month needs to pay numerous bills including utility bills, credit card bills, insurance payments, etc. The most common method of payment of the bills is writing paper checks for the appropriate amounts and mailing such checks to payees. However, when the mailing occurs close to the deadline for the payment, which is common, the check is oftentimes still in transit on the due date. Accordingly, a notice is sent by the payee indicating an overdue balance, which usually has been paid by the time the notice reaches the payer as the payee has already received the check before then. This practice proves to be annoying to the payer and a waste of resources to the payee in sending out unnecessary notices. This being so, there exists a need for an efficient method for remitting payments.

In solving such a need, we have revolutionized the concept of a postage indicium which is traditionally used as a proof of postage. We have recognized that a postage indicium is documentation of a transaction by the originator of the indicium. In accordance with the invention, by incorporating, in addition to the postal data, transactional data including a transaction amount and payment instructions in a postage indicium, the indicium becomes a financial instrument similar to a money order payable to a specified payee.

Figure 7:
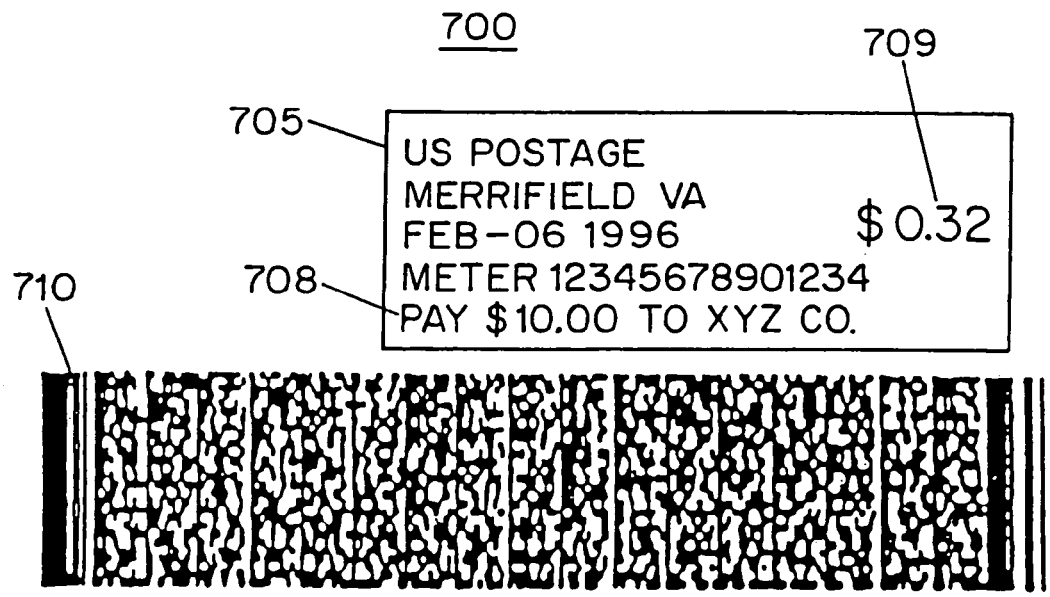
FIG. 7 illustrate a second postage indicium in accordance with the invention.

FIG. 7 illustrates postage indicium 700 in accordance with the invention. As shown in FIG. 7, indicium 700 includes human readable portion 705 and bar-code portion 710. Unlike portion 605 of FIG. 6, portion 705 includes human readable transactional data 708 indicating a payment (e.g., $10.00) to a specified payee (e.g., XYZ Co.). As described hereinbelow, like postage 709 (e.g., $0.32), the payment amount (i.e., $10.00) was deducted from the available funds in the descending register in card 180 when indicium 700 was created. Thus, the originator of indicium 700 in this instance expended $10.00 additional postage (i.e., in addition to the $0.32 postage for the cost of delivery of the mail piece on which indicium 700 is applied) in favor of the postal authority. This additional expended amount is to be paid by the postal authority to the payee in a manner to be described.

Moreover, unlike bar-code portion 610 representing the required postal data and digital signature, portion 710 additionally includes transactional data. However, like portion 610, the data in portion 710 is readable by the postal authority when it uses a conventional bar-code scanner to process the indicium. In accordance with the invention, after learning the transactional data in portion 710, the postal authority pays the specified amount to the payee.

Figure 8:
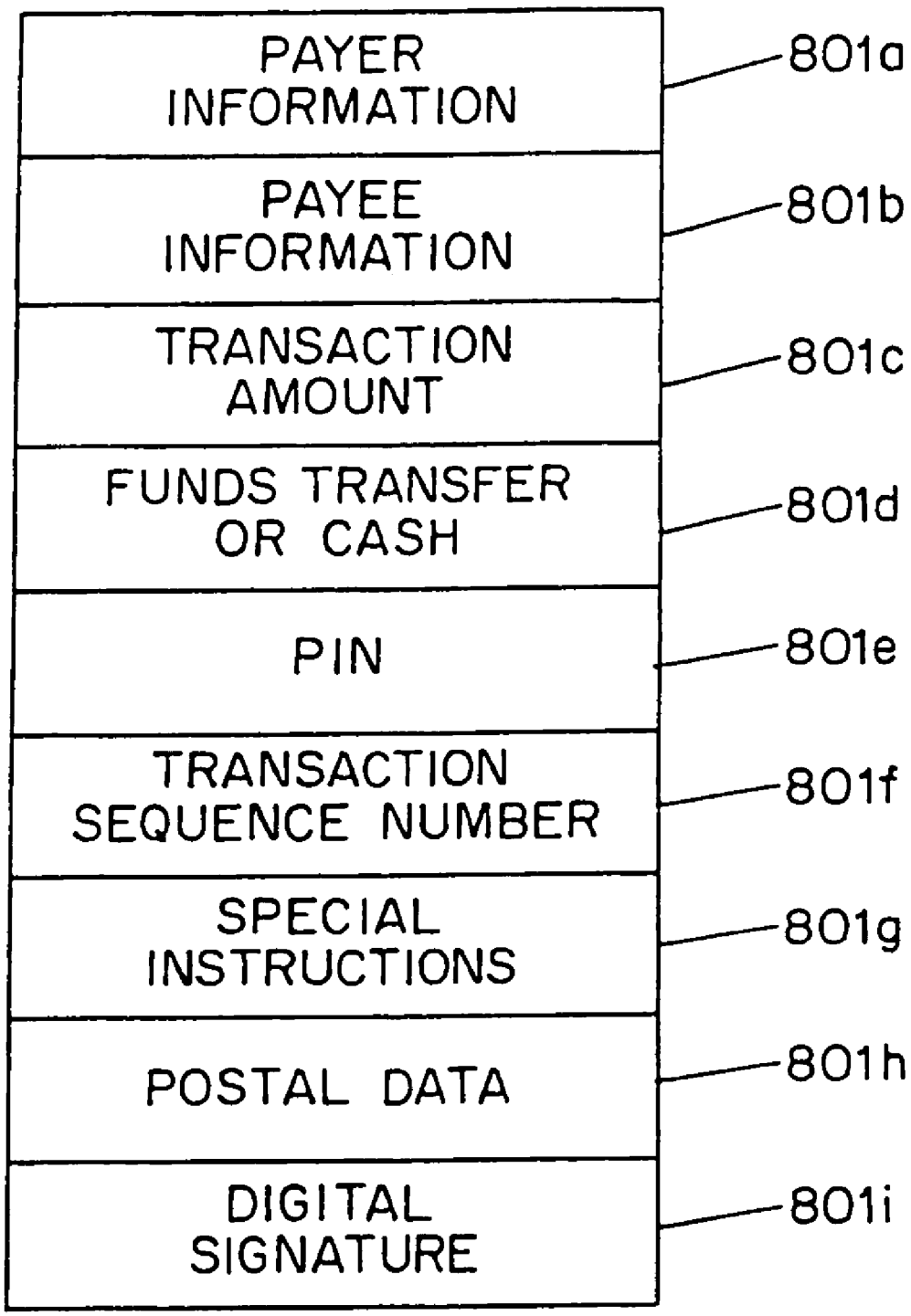
FIG. 8 is a table enumerating different data fields in a bar-code portion of the indicium of FIG. 7.

FIG. 8 illustrates different data fields in bar-code portion 710. In particular, fields 801a through 801g contain the transactional data in accordance with the invention. Specifically, field 801a contains data identifying the payer and particularly data identifying the payer account with the payee for proper credit of the payment. For example, the payee, XYZ Co., in this instance is a credit card company. The payer is a credit card holder who originated indicium 700 to pay his/her credit card balance (e.g., $10.00) in accordance with the invention. Thus, in this example, the data in field 801a is most likely the payer's credit card account number.

Field 801b contains data identifying the payee, and the payee's bank account if a transfer of funds (in this instance in the amount of the credit card balance) by the postal authority to the payee is anticipated to realize the bill payment. In this instance, the data in field 801b represents the name of the payee and an EFT routing number identifying the payee's bank account.

Field 801c contains data representing a transaction amount, which in this instance is $10.00.

Field 801d contains a data bit. A first value (e.g., a binary "1") of this data bit indicates to the postal authority that the payment is realized by funds transfer to the payee. A second value (e.g., a binary "0") indicates to the postal authority that the payment is realized by paying cash to the payee. In this instance, the data bit is set to the first value.

Field 801e contains data representing a personal identification number (PIN) which is used for security reasons described hereinbelow.

Field 801f contains data identifying the present transaction, which may be a transaction sequence number. With this data, the payer can communicate with the postal authority to, for any reason, cancel the transaction before the transaction is consummated, and have the transaction amount (probably less some processing fee) returned by the postal authority to the payer in cash or deposited into the payer's account with the postal authority. The postal authority then registers at a central computer that the subject transaction or postage indicium has been cancelled.

Field 801g contains data representing special instructions to the postal authority concerning the transaction. For example, the instructions may specify a payment date which may be the actual payment due date, or an expiration date after which the present transaction is no longer valid. In addition, by the special instructions, the payer may request the postal authority to send to the payer a confirmation of payment to the payee. Further, the postal authority may apply a digital signature onto the confirmation, authenticating the date of payment or certifying the funds transfer to the payee. The digital signature thus becomes a secure post mark.

Field 801h contains postal data similar to that in portion 610, which is required by the postal authority.

Field 801*i* contains a digital signature resulting from signing the data in fields 801*a* through 801*h* using the same encryption key as that used to sign the postal data in portion 610. If any alteration in either digital signature or any data in fields 801*a* through 801*h* occurs, the digital signature does not verify.

When indicium 700 appearing on a mail piece is processed by the postal authority's payment handling equipment in accordance with the invention, the latter verifies the digital signature and registers the transactional data in bar-code portion 710. If the signature is valid, the equipment checks with a central computer whether indicium 700 has been cancelled. If it has not been cancelled, the equipment initiates an electronic transfer of the specified funds to the payee's bank account, along with the data identifying the payer and/or payer account with the payee for proper credit thereto. The equipment then communicates to the central computer that indicium 700 has been paid, thereby canceling the indicium. That is, re-presentation of indicium 700 or the information content thereof to any payment handling equipment thereafter is countered with a payment denial.

If the aforementioned payment handling equipment is located at designated postal authority mail processing locations. The mail piece on which indicium 700 is applied is addressed to the closest designated location. It should be noted that since the mail piece on which indicium 700 is applied does not need to reach the payee to realize the bill payment in accordance with the invention, the transit time of the mail piece is advantageously shorter than that using the traditional check mailing method. It will be appreciated that the transit time of the mail piece can be completely eliminated by presenting, in person, indicium 700 at any designated location for an immediate bill payment. In that case, the cost of delivery (i.e., the $0.32 postage) is obviated, and thus postage 709 should show zero.

It is noteworthy that the functionalities of the above payment handling equipment should be readily incorporated in such systems capable of processing mail pieces having postage indicia of FIG. 6. The incorporation simply requires the mail processing system to be capable of funds transfer through an EFT network and communicating with a central computer, and enhancement of software in the system to realize the above-described transactional functions.

For the ensuing discussion, without loss of generality, we reasonably assume that each mail processing system incorporates the payment handling functionalities in question. In that case, the mail piece on which indicium 700 is applied need not be addressed to any particular postal authority location. In fact, it may be applied onto a mail piece addressed to anybody, say, a friend. When the mail piece is processed by a mail processing system, it not only causes the mail piece to be delivered to the friend, but also the specified payment (i.e., $10.00) to be made to the designated payee (i.e., XYZ Co.). For privacy reasons, transactional data 708 in that case need not be shown. In addition, for an immediate bill payment, the payer can present, in person, indicium 700 (less the $0.32 postage) to any post office having a mail processing system, which is virtually every post office.

In accordance with another aspect of the invention, indicium 700 (less the $0.32 postage) can be used as cash. In that case, the payee shown in transaction data 708 is "cash" (instead of "XYZ Co."), and the data bit in aforementioned field 801*d* is assigned the second value (i.e., "0" in this instance) to indicate cash payment. In addition, since any bearer of such an indicium is able to cash the indicium for the specified amount at a post office, the indicium is preferably printed on special paper or medium against fraudulent duplication thereof using, say, a photo copier. In any event, for fear that the cash-indicium is accidentally lost, stolen or duplicated, a PIN can be assigned in aforementioned field 801*e*. In fact, when a mail processing system recognizes a "0" value in field 801*d*, it automatically checks for the PIN in field 801*e*. If the latter is a default "NULL" field, indicium 700 is regarded as cash. If the field has a value other than "NULL," indicium 700 is regarded as a "traveler's check," which requires PIN verification before it can be cashed. In that case, the legitimate bearer of indicium 700 would have been provided by the originator of the indicium with the correct PIN.

It should be pointed out that when a PIN is used in indicium 700, it is preferably encrypted for fear that an unauthorized bearer of the indicium would otherwise be able to read the PIN from portion 710 using a bar-code scanner. For that matter, all other transactional data and/or postal data in bar-code portion 710 may also be encrypted.

In accordance with yet another aspect of the invention, when indicium 700 (less the $0.32 postage) indicating a specified payee (e.g., XYZ Co.) is delivered to the payee, without going through any mail processing system, the payee can redeem the indicium at any post office as if it were a money order, which is payable only to the specified payee. Depending on the value of the data bit in field 801*d*, the payee receives cash for the indicium if the data bit has the second value, and otherwise if the data bit has the first value, the payee is entitled to a funds transfer in the corresponding amount to the payee's bank account.

In particular, by specifying the payee to be a courier such as FedEx, indicium 700 (less the $0.32 postage) can be used as payment for the courier service. In that case, indicium 700 can accompany or be attached to the package to be delivered by the courier. Using such an indicium, or a copy thereof (in the event that the indicium is permanently attached to the package), the courier can receive the actual payment from the postal authority as if it were a money order as described before. As such, we have invented a universal postage indicium (i.e., indicium 700) good for payment not only to the postal authority but any other courier for its service.

Generation of indicium 700 is accomplished by entering, on mail processor 150, transactional data for data fields 801*a* through 801*g* in addition to the required postal data. The actual transactional data entry may be menu driven and achieved using the key pad of processor 150 or the keyboard of computer 103. After receiving the transactional data and the postal data, processor 150 forwards them to cryptographic processor 205 in card 180 for processing. Processor 205 in this instance is programmed to deduct the transaction amount (derived from the transactional data) plus the postage amount (derived from the postal data) from the available postage funds in the descending register, and accordingly adds same to the dispensed funds in the ascending register. Based on the transactional data and postal data, processor 205 then creates postage indicium 700. Processor 205 thereafter transmits image data representative of the indicium to mail processor 150 where it is formatted for printing on printer 190.

A second technique for reducing the mail transit time in the traditional check mailing method will now be described. In accordance with this second technique, the contents of the payer's mail piece, including a remittance in some specified amount, are indicated with certain encrypted information within the postage indicium on the mail piece. In the alternative, the contents are indicated by other markings printed on the mail piece, or onto a selected area of a sheet of paper inside the mail piece such that the markings are exposed through an appropriate window in the envelope. The encrypted information includes such detail as is required by the payee to establish confidence in the payer's assertion that remittance is being made. For example, the encrypted information may include the payer's digital signature (guaranteeing the contents subject to a legal penalty), the payer's account number with the payee, the payer's bank account number, the amount remitted, etc.

When the mail piece is received and processed by the postal authority's or other courier's automation equipment, the aforementioned encrypted information is electronically read. The portion of the information pertaining to the payer's remittance as required by the payee is electronically captured and, in a timely fashion, communicated to the payee. At the same time, the payee is informed of the approximate delivery time of the mail piece containing the payer's remittance. The delivery time is estimated based on the current status of the mail piece (e.g., the time and date, location within an automated sortation and handling system, etc.) and its ultimate destination (the payee's postal or routing code, the carrier sortation route, etc.).

It should be noted that during the processing of the mail piece, the postal authority or courier may re-route it to a financial institution for immediate deposit of the remittance. Such re-routing instructions, if any, are provided by the payee. Once receipt of the payment is acknowledged by the financial institution, the final account reconciliation between the institution and the payee is confirmed.

Further, the encrypted information on the mail piece may also be used to convey data other than monetary data, e.g., partial payment, redirection of payment, and order information.

The foregoing merely illustrates the principles of the invention. It will thus be appreciated that those skilled in the art will be able to devise numerous other systems which embody the principles of the invention and are thus within its spirit and scope.

For example, it will be appreciated that postage payment system 100 will be expanded to include a paper handling system, feeder, transport, zip code scanner, and/or an envelope printers where appropriate.

In addition, in the disclosed embodiment, the mailing application program of FIG. 4 is used to generate a postage indicium on the mail contents. However, such a program is equally applicable to generating a postage indicium on the cover of a mail piece, an envelope, a postcard, etc.

Moreover, in the disclosed embodiment, the mailing application program is installed on computer 103 only. However, such a program may reside in an interactive network, instead, and intercepts a specified word processor output to add the requisite control sequence to the print stream.

Further, mail processor 150 may require coded access to postage dispensing. The access may be based on person-by-person, department-by-department, or other controlled access deemed appropriate.

Mail processor 150 may also be interfaced with a management information system (MIS) capable of invoice processing and printing applications. In that instance, mail processor 150 will be used to enhance the MIS functions by applying proof of postage directly onto invoices concurrently with the preparation of the invoices and any inserts. The MIS would provide to the mail processor such information as the number of pages, inserts, mail class, etc. concerning each invoice, along with weight-related data regarding the envelope and content materials. The mail processor would then calculate the required postage and properly apply the proof of postage to the invoice.

In addition, it will be appreciated that mail processor 150 will incorporate a well-know address cleansing capability for matching, verifying, and correcting the sender and recipient addresses and their zip codes.

Moreover, mail processor 150 may allow the user to obtain shipping rates of different couriers (e.g., UPS, FedEx and USPS) and to compare rates among such couriers. It may also be capable of determining the best method of shipment based upon user parameters such as cost and speed.

Further, mail processor 150 may be capable of communicating with a main frame or host computer to receive mail processing directions (e.g., set up parameters) and printer applications.

Still further, mail processor 150 may be capable of printing bar-coded digital signatures on the material to be facsimile-transmitted. It can also scan or digitally read facsimile-transmitted material at its destination using public/private key cryptography to authenticate the transmission for the recipient. Further, it can transmit data with an appropriate digital signature using an encryption algorithm provided in a control/smart/PCMCIA card such as IC card 180 Processor 150 is also capable of receiving facsimile material. Transmitted and received facsimile information may be encoded and decoded.

It will also be appreciated that mail processor 150 can communicate with a third party certification authority (e.g., a digital notary) through a communication network 110 (e.g., the Internet) to provide verification to the sender that the recipient has (1) received the transmitted data, (2) accessed the transmitted data, and/or (3) converted the transmitted data to plain text.

In addition, it will be appreciated that card 180 can be used as a general purpose prepaid card for purchasing products and services. Using its cryptographic engine, card 180 is also capable of storing and dispensing digital money in the manner typified by a digital wallet or cash card.

Moreover, in the disclosed embodiment, a TMS process is used to replenish the postage in card 180, which requires a pre-funded escrow account with the postal authority. However, it will be appreciated that a user will be able to establish a different type of account with the postal authority (or any other courier or trusted third party) for purchasing the postage, such as an account based on line of credit pre-approved by the postal authority, a charge card, a debit card, a credit card, etc. Each postage purchase is accompanied by crediting the corresponding purchase amount to the postal authority.

Further, it will be appreciated that the user may purchase the postage on-line (e.g., through a modem or data set connection) on a transaction by transaction basis using a credit card, debit card, ATM card, etc. As soon as a postage indicium is provided as a result of the on-line purchase, the card account is debited with the purchase amount and a postal authority account is credited accordingly.

Moreover, it will be appreciated that portions 605 and 610 of postage indicium of FIG. 6 and portions 705 and 710 of indicium 700 may be imparted to a label/tape for affixing to a mail piece, enclosure or to an appropriate location on the contents of said mail piece.

Finally, although postage payment system 100, as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices. In particular, in the disclosed embodiment, mail processor 150 and computer 103 are shown to be two separate elements. However, it will be appreciated that all or part of the functions of processor 150 will be realized in computer 103. It will also be appreciated that all or part of the functions of computer 103 are realized in processor 150 with a dedicated/secure printer, thereby realizing a self-contained postage metering system.

We claim:

1. A postage indicium processing system comprising at least a postage indicium dispensing apparatus, the postage indicium dispensing apparatus comprising:
    a processor for creating a postage indicium for processing by a first party, the postage indicium including:
        a proof of payment, and
        transactional data comprising at least information representative of a transaction amount,
    the first party causing the transaction amount to be paid to a second party in response to at least the transactional data when the first party processes the postage indicium; and
    a printer interface for sending output for generating said postage indicium;
    wherein the first party is a courier service or a postal authority, and the second party is a payee.

2. The apparatus of claim 1 wherein said transactional data includes information identifying said second party.

3. The apparatus of claim 1 wherein said transactional data includes information concerning an originator of said postage indicium.

4. The apparatus of claim 1 wherein said transactional data includes an indicator indicative of a method by which the transaction amount is paid to the second party.

5. The apparatus of claim 4 wherein said method includes an electronic funds transfer.

6. The apparatus of claim 1 wherein said transactional data includes a personal identification number (PIN).

7. The apparatus of claim 6 wherein said PIN is encrypted.

8. The apparatus of claim 1 wherein said transactional data includes instructional information, the first party causing the transaction amount to be paid to the second party in response to the instructional information.

9. The apparatus of claim 8 wherein said instructional information includes a request for a confirmation by the first party to the second party that the transaction amount has been paid.

10. The apparatus of claim 8 wherein said instructional information includes information on a date by which the transaction amount is paid to the second party.

11. The apparatus of claim 1 wherein said postage indicium includes a digital signature for authenticating at least part of said postage indicium.

12. The apparatus of claim 1 wherein said transactional data is encoded in a bar-code.

13. The apparatus of claim 1 wherein said postage indicium includes a human readable portion.

14. The apparatus of claim 13 wherein said human readable portion includes information identifying said second party.

15. The apparatus of claim 13 wherein said human readable portion includes the transaction amount.

16. The apparatus of claim 1 wherein said postage indicium includes a machine readable portion.

17. The apparatus of claim 1 wherein said first party is a postal authority.

18. The apparatus of claim 1 wherein said first party is a courier other than a postal authority.

19. The apparatus of claim 1 wherein the amount of said payment for service is zero.

20. The apparatus of claim 1 wherein said postage indicium is generated onto a tangible medium.

21. The apparatus of claim 20 wherein said tangible medium includes a label.

22. The apparatus of claim 1 wherein said postage indicium is generated onto a mail piece.

23. A method for dispensing payments comprising the steps of:
    creating a postage indicium for processing by a first party, the postage indicium including:
        a proof of payment, and
        transactional data comprising at least information representative of a transaction amount,
    the first party causing the transaction amount to be paid to a second party in response to at least the transactional data when the first party processes the postage indicium; and
    generating the postage indicium;
    wherein the first party is a courier service or a postal authority, and the second party is a payee.

24. The method of claim 23 wherein said transactional data includes information identifying said second party.

25. The method of claim 23 wherein said transactional data includes information concerning an originator of said postage indicium.

26. The method of claim 23 wherein said transactional data includes an indicator indicative of a methodology by which the transaction amount is paid to the second party.

27. The method of claim 26 wherein said methodology includes an electronic finds transfer.

28. The method of claim 23 wherein said transactional data includes a PIN.

29. The method of claim 26 wherein said PIN is encrypted.

30. The method of claim 23 wherein said transactional data includes instructional information, the first party causing the transaction amount to be paid to the second party in response to the instructional information.

31. The method of claim 30 wherein said instructional information includes a request for a confirmation by the first party to the second party that the transaction amount has been paid.

32. The method of claim 30 wherein said instructional information includes information on a date by which the transaction amount is paid to the second party.

33. The method of claim 23 wherein said postage indicium includes a digital signature for authenticating at least part of said postage indicium.

34. The method of claim 23 wherein said transactional data is encoded in a bar-code.

35. The method of claim 23 wherein said postage indicium includes a human readable portion.

36. The method of claim 35 wherein said human readable portion includes information identifying said second party.

37. The method of claim 35 wherein said human readable portion includes the transaction amount.

38. The method of claim 23 wherein said postage indicium includes a machine readable portion.

39. The method of claim 23 wherein said first party is a postal authority.

40. The method of claim 23 wherein said first party is a courier other than a postal authority.

41. The method of claim 23 wherein the amount of said payment for service is zero.

42. The method of claim 23 wherein said postage indicium is generated onto a tangible medium.

43. The method of claim 42 wherein said tangible medium includes a label.

44. The method of claim 23 wherein said postage indicium is generated onto a mail piece.

45. The system of claim 3, wherein the originator is a payor of the transaction amount.

46. The method of claim 25, wherein the originator is a payor of the transaction amount.

* * * * *